Oct. 4, 1960

R. H. KRESS 2,954,671

POWER STEERING MEANS

Filed July 14, 1958

INVENTOR:
RALPH H. KRESS
BY John F. Schmidt

United States Patent Office 2,954,671
Patented Oct. 4, 1960

2,954,671

POWER STEERING MEANS

Ralph H. Kress, Peoria, Ill., assignor to Le Tourneau-Westinghouse Company, Peoria, Ill., a corporation of Illinois Filed July 14, 1958, Ser. No. 748,299

3 Claims. (Cl. 60—52)

This invention relates to power steering means, and especially to power steering means for a heavy-duty vehicle which cannot be steered by manual means and for which it is desirable to provide alternative means to steer the vehicle when the main power source fails.

In conventional automotive design, as for example in passenger automobiles as made today, failure of the power steering means presents no serious problem because the vehicle can still be steered by manual "power." In the case of heavy-duty vehicles such as the very large capacity off-highway trucks, steering requires the application of a very considerable force. The force required is often so large so to make steering of the vehicle impossible upon failure of the main power source. Under such conditions, the operator loses control of the vehicle and an accident may result.

It is an object of this invention to provide power steering means for a vehicle which has a primary source of power and a secondary source of power, with the two systems so interrelated and interconnected that failure of the primary power source automatically brings the secondary power source into action. This and other objects are accomplished in a system in which an engine driven pump provides the primary power source, and failure of the primary power source automatically puts into action a secondary power source which includes a battery driven electric motor and a pump connected to that motor.

Figure 1:
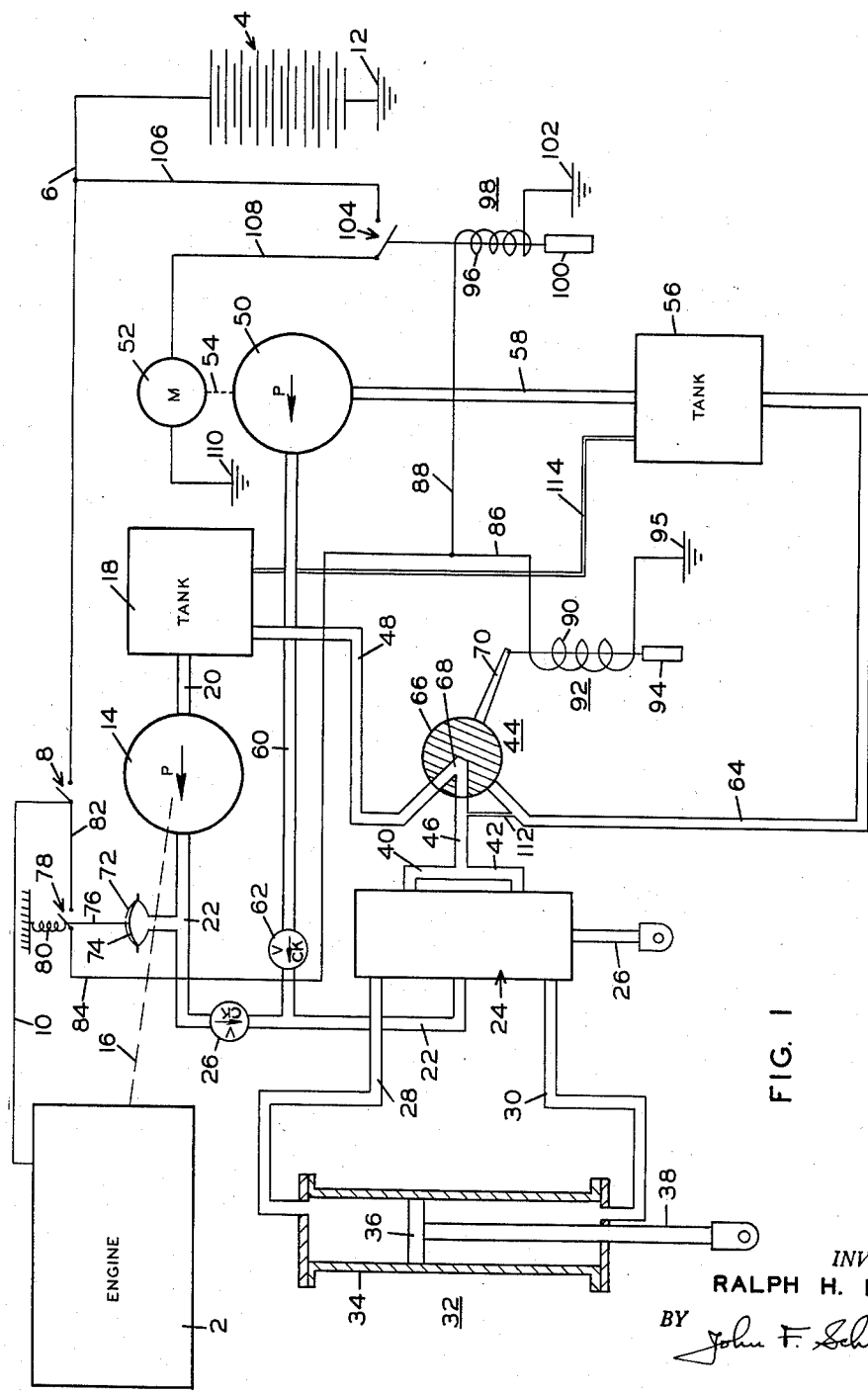
Fig. 1 is a schematic view of a preferred embodiment of the invention.

An engine 2 of any suitable conventional type is shown schematically, and it will be understood by those skilled in the art that engine 2 may be any one of a large number of engines which are suited to the powering of heavy-duty vehicles. A conventional storage battery is shown at 4. Battery 4 is connected by a conductor 6 with one terminal of an ignition switch indicated generally at 8. A conductor 10 connects the ignition switch with the ignition system of the engine. The ignition system need not be shown because it is completely conventional. It will suffice to point out that the return conductor from the ignition system is provided by a ground (not shown). Battery 4 is grounded in the conventional manner as shown at 12.

Engine 2 is of course connected to the drive wheels of the vehicle in any suitable conventional manner. The engine is also connected to drive a pump 14, the drive connection being shown schematically by a dotted line 16. It will of course be understood by those skilled in the art that the connection 16 may be any one of a number of suitable types.

Pump 14 draws hydraulic fluid from a tank or reservoir 18 through a conduit 20, and discharges fluid under pressure by way of a conduit 22 to a steering valve 24. A check valve 26 is provided in the conduit 22 and prevents return flow of fluid through the conduit.

Steering valve 24 may be any one of a number of conventional, commercially available, valves. It is provided with a control spool (not shown) which is connected to an actuating rod 26. Rod 26 will be connected for actuation by the manually operated steering linkage in a manner which need not be detailed here.

Valve 24 has connected with it two conduits 28 and 30, these conduits connecting with the discharge ports of the valve and with opposite ends of a steering motor 32. Steering motor 32 is a conventional type comprising a cylinder 34 and a piston 36, the piston having a connecting rod 38 connected therewith. Connecting rod 38 is connected in any suitable manner with the dirigible wheels of the vehicle. Steering valve 24 is also provided with exhaust ports with which conduits 40 and 42 connect. These two conduits in turn connect with a second valve 44 by way of a conduit 46.

Valves 24 and 44 form common parts of fluid return systems for the primary and secondary power sources. Thus, a conduit 48 connects valve 44 with the tank or reservoir 18, so that the fluid return means for pump 14, from steering motor 32, consists of: either conduit 28 or 30, valve 24, conduit 40 or 42, conduit 46, valve 44, conduit 48, tank 18, and conduit 20.

The secondary source of fluid under pressure includes a pump 50 and an electric motor 52 connected to drive the pump by a conventional driving connection shown schematically at 54. Pump 50 is connected to receive fluid from a tank or reservoir 56 by means of a conduit 58. Pump 50 discharges fluid under pressure to conduit 22 by way of a conduit 60 in which there is disposed a check valve 62. The connection of conduit 60 with conduit 22 is made at a point on the downstream side of check valve 26.

The fluid return means for pump 50 includes certain conduits common to the first-named fluid return means, as well as valves 24 and 44. A conduit 64 connects valve 44 with tank 56, and is of course not a part of the fluid return means for pump 14.

A further word may be said about valve 44. This valve is a conventional two-position valve, and is here shown schematically as comprising a movable body portion 66 in which there is provided a V-shaped passage 68. One branch of the V is always in communication with conduit 46; whichever branch is so connected, the other branch is connected either with conduit 48 or conduit 64. A handle 70 is shown connected to body 66 to actuate the valve from one operating position to another.

For a description of the means to operate valve 44, reference is made again to pump 14 and its discharge conduit 22. A preferred embodiment of the invention includes means responsive to failure of the primary fluid supply means, such failure-responsive means being provided to activate the secondary fluid supply means and to actuate valve 44; valve 44 is operated to interrupt fluid flow through the fluid return means for pump 14 and to establish fluid flow through the fluid return means for pump 50.

More specifically, a pressure sensitive device 72 is connected in the discharge conduit 22 so as to be subject to the pressure in conduit 22. As here shown schematically, device 72 is provided with a flexible diaphragm 74, of which the upper face is exposed to atmospheric pressure and the lower face is exposed to the pressure in conduit 22. A link 76 connects diaphragm 74 with the movable element of an electric switch 78, working against the bias of a spring 80 which tries to keep the switch closed.

One terminal of switch 78 is connected by a conductor 82 with one terminal of switch 8 of which the other terminal is connected to conductor 6 as aforementioned. The other terminal of switch 78 is connected with a conductor 84, and through conductor 84, to branch conductors 86 and 88. Conductor 86 is connected with the coil 90 of a solenoid 92 which has an armature 94 connected to operate valve 44 by means of its handle 70. Coil 90 is conventionally grounded as shown at 95.

Branch conductor 88 is connected with a coil 96 of a solenoid 98 having an armature 100; coil 96 is grounded as shown at 102. Armature 100 is connected to operate the movable element of a switch 104 in an operating circuit for motor 52. One terminal of switch 104 is connected with conductor 6 by a conductor 106, and the other terminal of switch 104 is connected with one terminal of motor 52 by a conductor 108. The other terminal of motor 52 is grounded as shown at 110.

Preferably, a bleed line 112 connects conduits 46 and 64 to assure that the secondary fluid supply system is alway full of hydraulic fluid. Another bleed line 114 connects the vent of tank 56 with the main tank 18.

Figure 2:
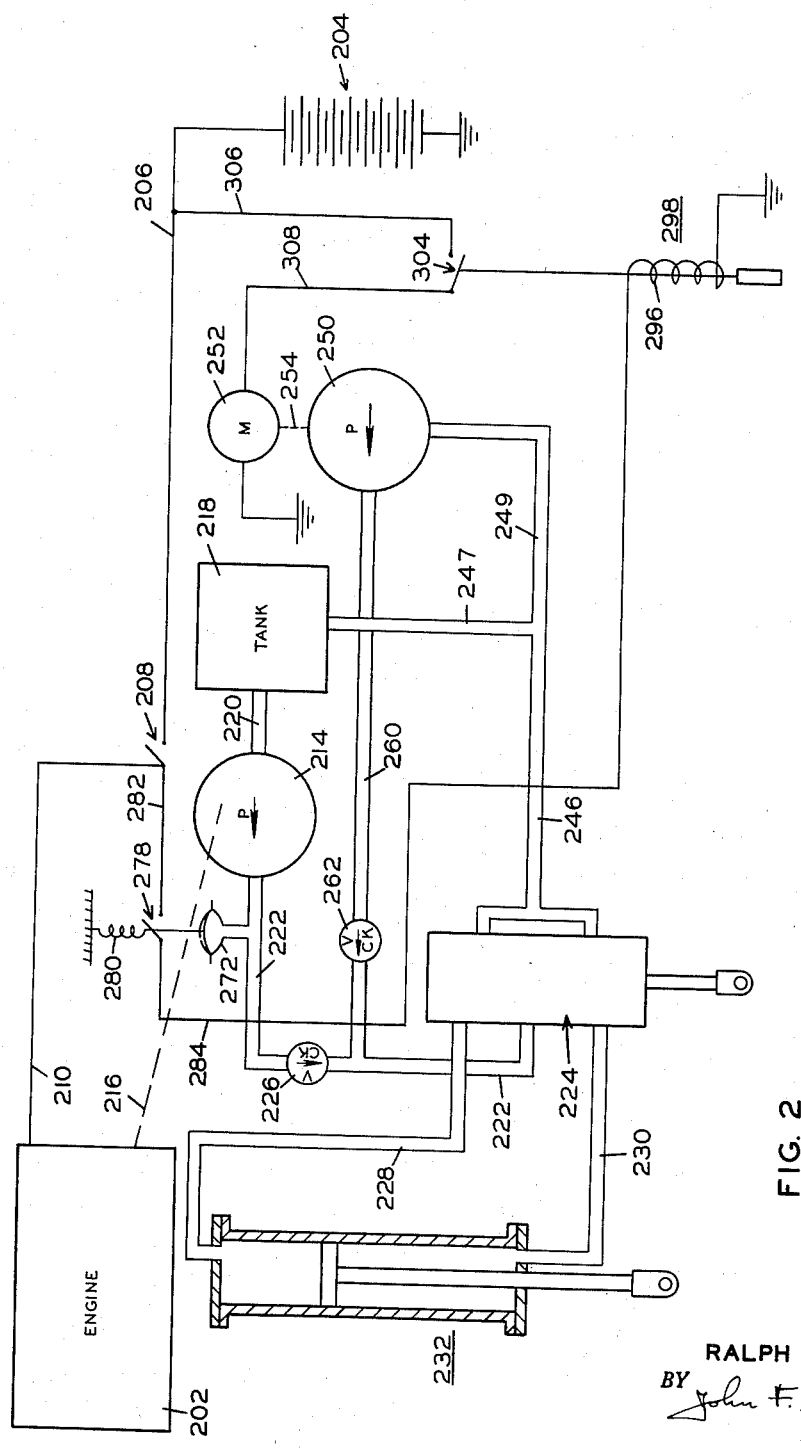
Fig. 2 is a schematic view of another embodiment of the invention, the embodiment shown in Fig. 2 being a simplified form of the embodiment shown in Fig. 1.

Reference will now be had to Fig. 2 for a discussion of the simplified embodiment of the invention there shown. In Fig. 2, elements which are the same or substantially the same as those in Fig. 1 will be identified by reference characters 200 numbers higher than those used for corresponding elements in Fig. 1. Thus, in Fig. 2, the ignition system of engine 202 is connected to battery 204 by a conductor 206, switch 208, and conductor 210. Pump 214 is connected to be driven by engine 202 through any suitable drive 216.

Pump 214 is connected to receive fluid from a tank 218 via conduit 220, and is connected to a discharge conduit 222 and through it to a steering valve 224. A check valve 226 is disposed in conduit 222.

Valve 224 has pressure discharge ports which are connected with conduits 228 and 230 and through them with the ends of a steering motor 232. The exhaust ports of valve 224 connect with a return conduit 246.

At this point, the hydraulic system of Fig. 2 begins to differ from that of Fig. 1. In the embodiment of the invention shown in Fig. 2, conduit 246 is provided with branch conduits 247 and 249; conduit 247 connects conduits 246 and 249 with tank 218.

A second means to supply fluid under pressure to motor 232 includes a pump 250 connected to be driven by an electric motor 252 through any suitable drive 254. Pump 250 is connected to receive fluid from tank 218 via conduits 249 and 247, and is connected to discharge fluid under pressure to conduit 222 via a conduit 260 in which there is disposed a check valve 262.

A pressure sensitive device 272 is connected to be subject to the pressure in conduit 222, and is connected to actuate a switch 278 which is normally biased closed by a spring 280. A conductor 282 connects terminals of switches 208 and 278, and a conductor 284 connects the remaining terminal of switch 278 with the coil 296 of a solenoid 298.

Solenoid 298 is connected to operate a switch 304 in the operating circuit of motor 252, which circuit also includes conductors 306 and 308.

Operation

Referring now again to the embodiment shown in Fig. 1, as long as engine 2 is in operation, pump 14 is running and supplies fluid under pressure to the conduit 22 through the check valve 26 and to steering control valve 24. At this time, ignition switch 8 is closed.

Under these conditions of operation, fluid under pressure in the pressure sensitive device 72 keeps the diaphragm 74 biased in its uppermost position against spring 80, holding the switch 78 open. From valve 24, fluid goes to the steering jack 32 by way of either conduit 28 or 30 and returns by way of the other conduit. Fluid leaves the steering control valve 24 by way of conduit 46. For this phase of the operation, valve 44 is in the position shown in Fig. 1. Accordingly, fluid flows from conduit 46 through passage 68 in the valve 44 to conduit 48, and thence to tank 18 and back to the pump 14 by way of the conduit 20.

Let it be assumed now that engine 2 fails for some reason. The engine 2 then stops running and of course the connected pump 14 also stops running, with the result that the pressure in conduit 22 falls, permitting spring 80 to close switch 78.

With switches 8 and 78 both closed, operating circuits are completed for both of the solenoids 92 and 98. The circuit for solenoid 92 is as follows: battery 4, conductor 6, switch 8, conductor 82, switch 78, conductors 84 and 86, coil 90, and back to battery 4 by way of ground. The circuit for solenoid 98 is the same to and including conductor 84, thence by way of conductor 88 to coil 96 and back to the battery by way of ground.

With solenoid 92 energized, armature 94 moves upward as seen in the drawing and moves the operating handle 70 of valve 44 through 45°. This shifts the location of passage 68 so that conduit 48 is no longer connected. Instead, conduit 46 is connected with conduit 64 through the valve passage 68.

Energization of solenoid 98 moves armature 100 upward as seen in the drawing, closing the switch 104 and completing an operating circuit for motor 52 as follows: battery 4, conductor 6, conductor 106, switch 104, conductor 108, motor 52, and back to the battery by way of ground.

With motor 52 connected and running, pump 50 runs and supplies fluid under pressure to steering valve 24 by way of conduit 60, check valve 62, and conduit 22. Return flow of hydraulic fluid is now provided by way of conduit 46, passage 68 of valve 44, conduit 64, tank 56, conduit 58, back to pump 50.

Thus, failure of the primary source of fluid under pressure brings into operation a secondary source of fluid under pressure and there is no loss of steering control.

The operation of the embodiment shown in Fig. 2 is similar to that shown in Fig. 1, except of course that there is only one reservoir or tank in Fig. 2. The operation of this simplified embodiment of the invention will be understood by those skilled in the art from what has been set forth above in the discussion of Fig. 1, and need not be repeated here.

It will be apparent from the foregoing that this invention provides a simple and reliable power steering means for a heavy-duty vehicle which cannot be steered manually. Other advantages will be apparent to those skilled in the art.

While there are in this application specifically described two forms which the invention may assume in practice, it will be understood that these forms are shown for purposes of illustration and that the invention may be modified and embodied in various other forms without departing from its spirit or the scope of the appended claims.

What is claimed is:

1. A power steering device for an engine powered vehicle having means by which at least some of the wheels may be dirigibly turned, said device including: a steering valve; a hydraulic steering motor connected to receive fluid from said valve and connected steerably to turn the dirigible wheels; a first pump connected to the engine to supply fluid under pressure to said motor when the engine is running; a second pump; an electric motor connected to the second pump; a source of electric power; wiring means connecting the electric power source and the electric motor to energize the electric motor from the electric power source, the wiring means including a normally closed switch and an operator-operable switch connected in series; a first fluid conduit from the first pump to the valve; a second fluid conduit from the second pump to the first conduit; a first check valve in the first conduit between the first pump and the point of juncture of the two conduits to limit the flow of fluid to flow in the direction from the first pump to the steering valve; a check valve in the second conduit between the second pump and the point of juncture to limit the flow of fluid to flow in the direction from the second pump to the steering valve; and control means for the electric motor to normally deactivate the electric motor whereby the second pump normally will not deliver fluid to the valve, the control means including a pressure responsive control device connected to the first conduit between the first pump and the first check valve to activate the electric motor when the pressure at the pressure responsive control device falls below a predetermined pressure whereby in such event the second pump will be activated to supply fluid to enable the vehicle to be steered if the operator-operable switch is closed.

2. A power steering device for an engine powered vehicle having a steering valve, a steering motor connected to said valve, a first reservoir, a first pump connected to the reservoir and the engine to supply fluid under pressure, a first pressure conduit between the pump and the valve and a first return conduit between the valve and the reservoir, said device including: a second reservoir; a second return conduit connected to the second reservoir; a two position valve connected to the two return conduits, the valve being effective when actuated to disconnect the first reservoir from the steering valve and to connect the second reservoir to the steering valve; a second pump connected to the second reservoir; normally inactive power means connected to the second pump to drive the same; a check valve in the first pressure conduit to prevent fluid from flowing in the conduit toward the first pump; a second pressure conduit connected to the second pump and to the first pressure conduit between the check valve and the steering valve; and control means connected to the two position valve and to the power means, the control means including a pressure responsive device connected to the first pressure conduit between the first pump and the check valve to activate the power means and to reposition the two position valve when the pressure at the pressure responsive device falls below a predetermined pressure whereby in such event the second pump will supply fluid under pressure to the steering valve from the second reservoir to enable the vehicle to be steered.

3. A power steering device for an engine powered vehicle having means by which at least some of the wheels may be turned, said device including a hydraulic steering motor connected to the means; a steering valve connected to said motor; a first pump connected to the engine of said vehicle to be driven thereby; a second pump; an electric motor connected to the second pump to actuate the pump; a battery; wiring means connecting the battery and the motor to energize the motor from the battery, the wiring means including a normally closed switch and an ignition switch connected in series; reservoir means to supply the pumps with hydraulic fluid; hydraulic pressure responsive means connected to the normally closed switch to open the normally closed switch in response to pressure in excess of a predetermined amount; a check valve; first conduit means connected to the second pump; and second conduit means connecting sequentially the first pump, the hydraulic pressure responsive means, the check valve, the first conduit means and the steering valve; whereby pressure from the first pump at the pressure responsive means in excess of said amount will open the switch to deenergize the motor while a drop in pressure below said amount will allow the normally closed switch to close to energize the motor to supply fluid to the steering valve from the second pump if the ignition switch is closed.

References Cited in the file of this patent

UNITED STATES PATENTS

| | | |
|---|---|---|
| 1,955,922 | Lamond | Apr. 24, 1934 |
| 2,323,519 | Dean | July 6, 1943 |
| 2,345,213 | O'Shei | Mar. 28, 1944 |
| 2,674,854 | Church | Apr. 13, 1954 |